UNITED STATES PATENT OFFICE.

MICHAEL GATES, OF PAW PAW, MICHIGAN.

IMPROVEMENT IN PRUNING-HOOKS.

Specification forming part of Letters Patent No. 55,483, dated June 12, 1866.

*To all whom it may concern:*

Be it known that I, MICHAEL GATES, of Paw Paw, in the county of Van Buren and State of Michigan, have invented a new and useful Improvement in the implement known as a "Pruning-Hook," for the purpose of pruning or trimming trees, bushes, &c.; and I do hereby declare that the following is a full, clear, and exact description of the construction and operation of the same, reference being had to the annexed drawing, making a part of this specification, in which a perspective view of the implement is given.

The object of my invention is (without complicating the implement with a multiplicity of parts) to give to the cutting end of the chisel-bar an oblique motion across the face of the hook in such manner as to imitate the action of pruning by hand with what is termed a "draw-cut;" and the better to enable others skilled in the art to construct my invention, I will now proceed to describe it.

A represents the hook, B its attached stock, and C the cutting portion of the sliding chisel-bar D, which is operated by a lever, E.

The hook-stock and chisel-bar are represented in the drawing as broken apart, to indicate want of room to exhibit them in full proportionate length, especially as when designed for the pruning of large trees; and for such a purpose it is best to make the stock of wood and attach the steel hook A to one end by screws. Should the stock be made of iron, which is best when it is short and designed for trimming shrubbery, &c., the hooked extremity should still be of steel, welded on; for although the hook is not designed for cutting, having only a stunt edge, yet it is stiffer when of steel, and less liable to spring away from the cutting-chisel, and it should be provided with a handle, H, and side ears, to which the chisel-bar guides and pivot-screw of the lever E are attached.

The chisel-bar is provided with a short toothed rack at r, in which a segmental pinion, p, formed at the end of the lever, is geared for the purpose of actuating the cutting-chisel.

I effect the drawing cut by making a crook in the chisel-bar as near the cutting extremity as may be practicable, somewhat in the manner as seen at a, and compel the cutting-chisel to travel in the direction thus given by confining the bent portion of its bar between the two end guide-studs of a diagonal guide-plate, G', which is fastened to the ears of the hook-stock by screws s, which pass through the studs aforesaid.

I do not desire to confine myself to giving the cutting-chisel a diagonal movement across the face of the hook in a right line, for it may move in an arc of any desired circle by properly bending the bar to conform.

It will be seen that the rack end of the chisel-bar is confined and guided by another guide-plate, $G^2$, which is furnished with a projecting side ear, between which and a corresponding one on the side of the hook-stock the lever E is pivoted in the center of its segmental pinion.

J represents a stop attached to the stock, which is very useful in preventing the hands of the operator, which grasp the handles of the said stock and lever, from coming violently in contact after the cut is made.

When designed for heavy work rollers may be put on such of the guide-plate studs as are subjected to a rubbing action of the edges of the bar D; but ordinarily they may be very well dispensed with. The hook stock and bar can be made lighter if clasped with clasps open on one side, so as to permit free lateral motion in the direction of the cut. One of these clasps is seen at L.

When this implement is not in use its lever should always be kept shut in contact with the stop, for the cutting-chisel will then cover the face of the hook, and they will protect each other from injury.

When in use the operator, holding by the handles about in the manner shown in the drawing, places the hook A over the branch or shoot in the proper position to make a slanting cut, and revolves the lever until it comes in contact with the stop. The hook holds the shoot steady, while the chisel is, by the action of the gear, forced steadily, with a combined longitudinal and lateral motion, through the wood, making a perfectly clean draw-cut, and leaving the cut end of the shoot in the best possible condition for healing quickly.

It is, perhaps, unnecessary for me to say that my cutting-chisel should, in common with all others, be ground to a thin smooth cutting-edge; but I will say that the peculiar movement of mine enables it to make a much smoother cut than any in better condition that cut in a direct line.

I do not claim combining a cutting-chisel with a hook for pruning independent of the relative mode of operation, for I am aware that cutting-chisels have been used with straight bars that moved by the intervention of a lever in a direct and parallel line with the stock of the hook; but What I do claim as my invention, and desire to secure by Letters Patent, is—

Communicating a drawing-cut movement to the chisel C by bending its bar, as at $a$, and operating it between guides, in connection with the hook A and its attached stock, substantially in the manner and for the purpose herein described and set forth.

MICHAEL GATES.

Witnesses:
   E. A. THOMPSON,
   C. A. HARRISON.